Jan. 25, 1927.
I. EDLUND
1,615,746
DIRECTION INDICATOR
Filed Sept. 25, 1925
2 Sheets-Sheet 1
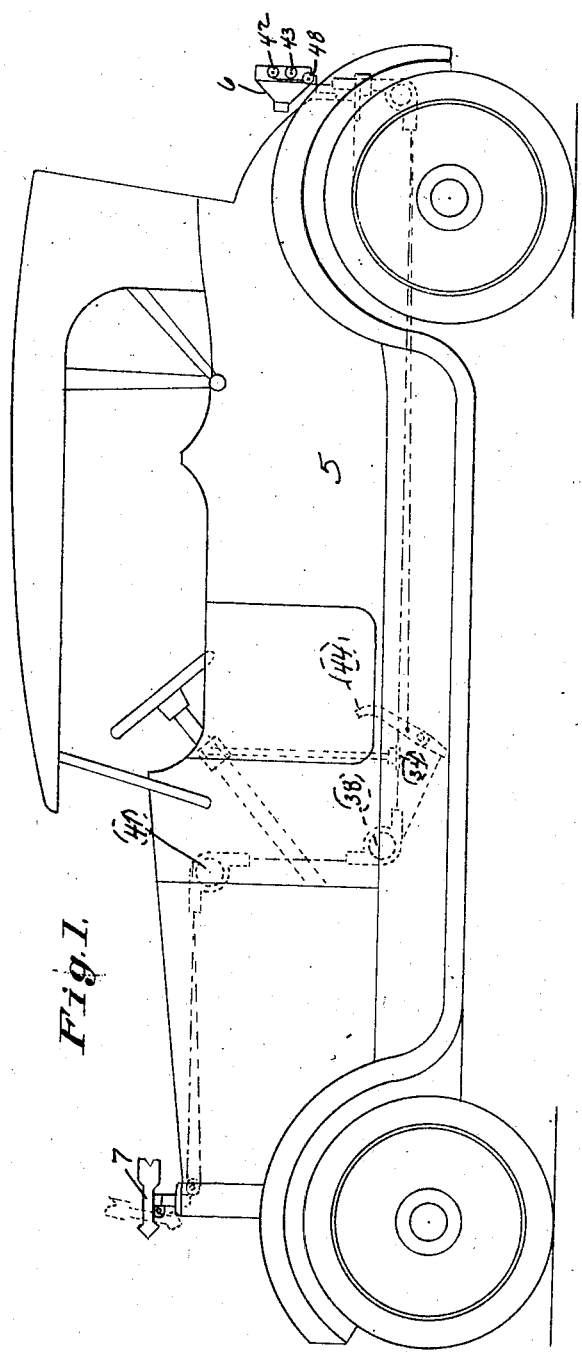
Inventor.
IVAR EDLUND
By Victor J. Evans
Attorneys.

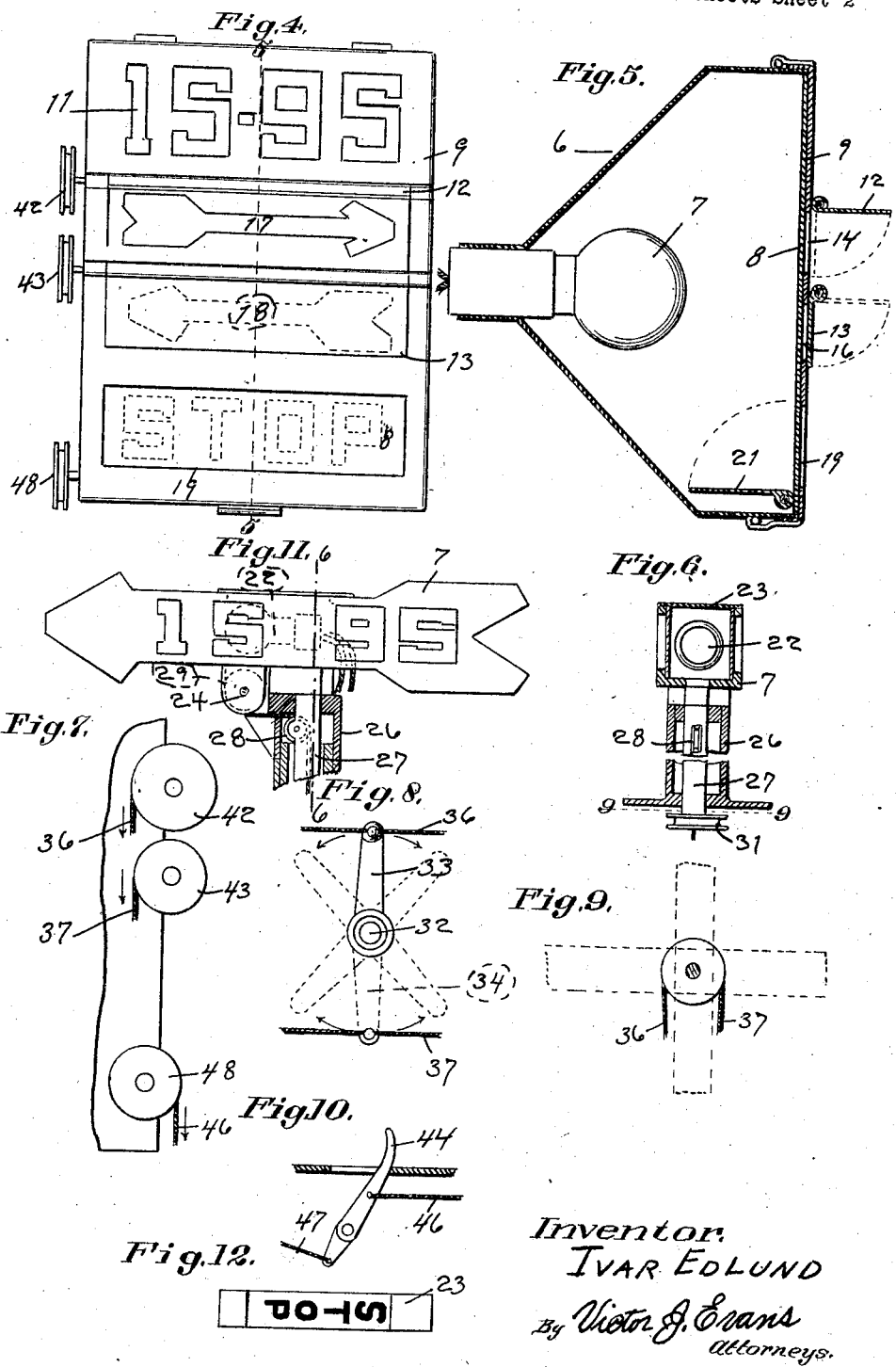

Patented Jan. 25, 1927.

1,615,746

UNITED STATES PATENT OFFICE.

IVAR EDLUND, OF SAN FRANCISCO, CALIFORNIA.

DIRECTION INDICATOR.

Application filed September 25, 1925. Serial No. 58,660.

This invention relates to improvements in direction indicators and has particular reference to an automobile direction indicator combined with a stop signal.

The principal object of this invention is to produce a stop signal which may be attached to any standard form of automobile without material altering the construction of the same.

Another object is to produce a device of the character described which is simple in construction, easy to manipulate and well within the purchase price of the average user.

A still further object of this invention is to produce a device of this character wherein the parts will not become easily deranged thereby resulting in confusion of signals.

Other objects and advantages will be apparent during the course of the following description.

In the accompanying drawings forming a part of this specification, and in which like numerals are employed to designate like parts throughout the same.

Figure 1 is a side elevation of an automobile having my device attached thereto, Figure 2 is a detail view showing the manner of conveying operating cables to distant points, Figure 3 is a vertical cross section through one of the sheaves taken on the line 3—3 of Figure 2, Figure 4 is a rear elevation of the signal box, Figure 5 is a cross section taken on the line 5—5 of Figure 4, Figure 6 is a cross section taken on the line 6—6 of Figure 11, Figure 7 is a fragmentary side elevation of Figure 4, showing the sheave arrangements, Figure 8 is a top plan view of the direction operating lever, Figure 9 is a cross section taken on the line 9—9 of Figure 6, Figure 10 is a fragmentary detail view showing the foot brake to which the stop cables are attached, Figure 11 is a side elevation partly in cross section showing the front signal, and Figure 12 is a top plan view of the stop sign as employed in the front signal.

I am aware of the fact that many types of turning signals have been devised, in most instances, however, the signals have been confined to the use in rear of machines, with a result that no definite direction was given to the machine approaching from the front, thus resulting in confusion and often serious accidents.

I have, therefore produced a direction indicator which will warn the person approaching from the front, as well as the person approaching from the rear as to his intention.

In the accompanying drawings wherein for the purpose of illustration is shown a preferred embodiment of my invention, the numeral 5 designates an automobile as a whole to the rear of which I attach a signal box 6 to the radiator of which I attach an arrow 7.

The signal box 6 has a source of illumination 7 positioned therein which is adapted to illuminate a pane of red glass 8, which is covered by a plate 9. This plate 9 is perforated near its upper extremity so as to outline figures corresponding to the license number of the machine, this is best shown at 11 of Figure 4.

At 12 and 13 I have shown hinged shutters adapted to close openings 14 and 16, respectively, formed in the plate 9. It is understood that a right hand and left hand arrow is formed upon the glass 8 at a point adjacent these openings 14 and 16, as indicated at 17 and 18, respectively of Figure 4.

An opening 19 in the plate 9 serves to form the ordinary tail light, while a shutter 21 hinged within the signal box and provided with the perforated word "Stop" when swung to a vertical position acts as a stop signal.

Referring now to the arrow 7 (see Figures 6 and 11), the same is preferably constructed of sheet metal so that the license number may be formed by punching out the metal so as to be illuminated by a bulb 22 positioned within the arrow.

A glass plate 23 positioned in the top of the arrow has the word "Stop" formed thereon, which arrow is pivoted as at 24 to a turntable 26 mounted upon the top of the radiator of the automobile.

A hollow shaft 27 controls the rotation of the turntable 26 and has a pulley 28 positioned therein which is in alignment with a pulley 29 mounted upon the pivot 24. A sheave 31 is secured to the bottom of the hollow shaft 27, the purpose of which will be later seen.

Referring now to Figure 8, the numeral 32 refers to a vertical shaft positioned adjacent the steering wheel of the automobile to which a crank 33 is attached. This shaft 32 passes beneath the floor of the automobile and has a cross arm 34 secured thereto. To the opposite ends of this cross arm are attached cables 36 and 37.

By now referring to Figure 2, it will be noted that the cable 36 extends in the opposite direction from the cross arm 34 and passes over the sheaves 38 and 39. The sheave 38 serving to conduct the cables 36 and 37 in an upward direction to a similar sheave 41 from which point the cables extend forwardly and are reaved about the sheave 31. The cables 36 and 37 which travel in a rearward direction pass over the sheave 39 and in an upward direction, thence over sheaves of the signal box, as follows:—The cable 36 being secured to the sheave 42, which sheave is attached to the pintle of the shutter 12, while the cable 37 is secured to the sheave 43 which sheave is secured to the pintle of the shutter 13.

The result of this construction is that when the lever 33 is moved toward the left of the driver the cable 36 will be pulled so as to swing the arrow 7 so as to point to the left at the same time the shutter 12 will be lifted so as to expose the left hand arrow. It is obvious that in moving the lever 33 toward the right will give an opposite signal indicating a right hand turn.

The stop signal is accomplished when the brake pedal 44 is pushed. This pedal has attached thereto cables 46 and 47. The cable 46 extends rearwardly over the sheave 39 and is attached to the sheave 48 which sheave is, in turn attached to the pintle upon the shutter 21.

The cable 47 travels in a forward direction over the sheave 38, sheave 41, upwardly through the tubular shaft 27, thence over pulley 28 and pulley 24, where it is secured to the forward portion of the arrow 7. The point of connection being forward to the center which results in the rear portion of the arrow being heavier and normally maintaining the arrow in a horizontal position.

When the brake is pressed, the arrow will tip as shown in dotted lines of Figure 7, at which time the word "Stop" which is placed upon the top of the arrow will be visible through the front and at the same time the shutter 21 will have been raised so as to give a person approaching from the rear warning that a stop is being executed.

It will thus be seen that with this device, I can give a signal which will be readily understood by a person approaching from either the front or the rear.

It is to be understood that the form of my invention herewith shown and described is to be taken as a preferred example of the same, and that various changes in the shape, size and arrangement of parts may be resorted to without departing from the spirit of the invention or the scope of the subjoined claim.

Having thus described my invention, I claim:—

In a device of the character described, the combination with an automobile having a signal box attached to the rear thereof, right and left hand arrows positioned on said signal box and adapted to be illuminated thereby, a pair of shutters adapted to overlie said arrows, an illuminated arrow remotely located with respect to said signal box, means for rotating said last mentioned arrow on a vertical pivot, simultaneously with the display of said right and left hand arrows of said signal box, and means for tipping said illuminated arrow on a horizontal axis for the purpose of displaying a stop signal.

In testimony whereof I affix my signature.

IVAR EDLUND.